(12) United States Patent
Arimatsu et al.

(10) Patent No.: US 10,424,978 B2
(45) Date of Patent: Sep. 24, 2019

(54) ROTATING ELECTRICAL MACHINE COMPRISING STATOR CORE, AND MACHINE TOOL COMPRISING THE SAME

(71) Applicant: FANUC CORPORATION, Yamanashi (JP)

(72) Inventors: Youhei Arimatsu, Yamanashi (JP); Kenji Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 15/491,482

(22) Filed: Apr. 19, 2017

(65) Prior Publication Data
US 2017/0310168 A1    Oct. 26, 2017

(30) Foreign Application Priority Data
Apr. 25, 2016 (JP) .................. 2016-087354

(51) Int. Cl.
*H02K 1/06* (2006.01)
*H02K 7/09* (2006.01)

(52) U.S. Cl.
CPC ................. *H02K 1/06* (2013.01); *H02K 7/09* (2013.01)

(58) Field of Classification Search
CPC ...................................................... H02K 7/09
(Continued)

(56) References Cited
U.S. PATENT DOCUMENTS
2013/0049507 A1*  2/2013  Lang ..................... H02K 7/09
                                                          310/90.5

FOREIGN PATENT DOCUMENTS
JP    S60-176432 A    9/1985
JP    H4-76164 U      7/1992
(Continued)

OTHER PUBLICATIONS

An Office Action; "Notification of Reasons for Refusal," Mailed by the Japanese Patent Office dated Apr. 24, 2018, which corresponds to Japanese Patent Application No. 2016-087354 and is related to U.S. Appl. No. 15/491,482; with English language translation.
(Continued)

*Primary Examiner* — Terrance L Kenerly
(74) *Attorney, Agent, or Firm* — Studebaker & Brackett PC (57) ABSTRACT

To provide a rotating electrical machine which can be easily configured at low lost, and which can highly accurately maintain an axial position (position in a thrust direction) of a rotating shaft in a prearranged position, and a machine tool, to which the rotating electrical machine is applied. A rotating electrical machine includes: a stator including a stator core; and a rotor supported on a rotating shaft supported by way of a non-contact bearing. When a section, in which a torque generation member exists in an axial direction of the rotating electrical machine, is defined as a torque generation section, a first end and a second end of the stator core in the axial direction extend outwards in the axial direction from a first end and a second end of the torque generation section at the rotor side in the axial direction. According to one aspect of the present invention, a length of the first end and the second end of the stator core extending outwards in the axial direction, from the first end and the second end of the torque generation section at the rotor side in the axial direction, is longer than a magnetic gap length of the rotating electrical machine.

7 Claims, 6 Drawing Sheets

(58) Field of Classification Search
USPC .......................................................... 310/90.5
See application file for complete search history.

(56) References Cited

FOREIGN PATENT DOCUMENTS

| | | |
|---|---|---|
| JP | H11-234931 A | 8/1999 |
| JP | H11-289733 A | 10/1999 |
| JP | H11-303788 A | 11/1999 |
| JP | 2002-101631 A | 4/2002 |
| JP | 2002-171735 A | 6/2002 |
| JP | 2004-194489 A | 7/2004 |
| JP | 2005-117846 A | 4/2005 |
| JP | 2008-169965 A | 7/2008 |
| JP | 2014-126174 A | 7/2014 |
| JP | 2014-212680 A | 11/2014 |
| JP | 2015-033244 A | 2/2015 |

OTHER PUBLICATIONS

An Office Action mailed by the Japanese Patent Office dated Nov. 13, 2018, which corresponds to Japanese Patent Application No. 2016-087354 and is related to U.S. Appl. No. 15/491,482.

An Office Action, "Decision of Refusal" mailed by the Japanese Patent Office dated Jun. 18, 2019, which corresponds to Japanese Patent Application No. 2016-087354 and is related to U.S. Appl. No. 15/491,482 with English.

* cited by examiner

ROTATING ELECTRICAL MACHINE COMPRISING STATOR CORE, AND MACHINE TOOL COMPRISING THE SAME

This application is based on and claims the benefit of priority from Japanese Patent Application No. 2016-087354, filed on 25 Apr. 2016, the content of which is incorporated herein by reference.

BACKGROUND OF THE INVENTION

Field of the Invention

The present invention relates to a rotating electrical machine including a stator core, and a machine tool including the rotating electrical machine.

Related Art

A rotating electrical machine such as an electric motor using a stator core has heretofore been known. In general, a rotating electrical machine is assembled such that deviation in a positional relationship between each component is small. However, due to dimension errors or assembly errors at the time of manufacture, if the positional relationship in terms of assembling a stator and a rotor in the axial direction is not appropriate, or assembly accuracy such as angularity to the rotating shaft is not appropriate, a force will be generated in the axial direction. Further, depending on the assembly errors (in terms of the direction or the tilting manner), problems such as generating a force to periodically move the shaft in the axial direction may occur. However, in many cases, a bearing having high support stiffness, such as a ball bearing, is used for a rotating shaft of a rotating electrical machine. Therefore, the problem of displacement, which is attributable to a force to periodically move a rotating shaft in the axial direction, would rarely become obvious. In other words, even if the rotating shaft is displaced in the axial direction to some extent, the degree of such displacement would remain negligibly minute, by virtue of the bearing having high support stiffness. Therefore, in terms of the intended use of such rotating electrical machines in many cases, the degree of displacement would not require realistic influences to be considered.

However, if the bearing is a non-contact bearing such as a magnetic bearing, a pneumatic bearing or a fluid bearing, problems would become obvious, such as the rotating shaft may be displaced in the axial direction or periodically vibrate due to a force generated in the axial direction as described above. In particular, in the case of a passive bearing which does not have any positional restoration function based on feedback of displacement in the axial direction, displacement or periodic vibration in the axial direction may become noticeable in occurrence. Further, in the case of a spindle of a machine tool used for the precision processing, if displacement in the axial direction as described above occurs in a rotating shaft of a rotating electrical machine connected to the spindle, even if the degree of displacement is minute, the processing accuracy would be deteriorated, leading to non-negligible circumstances.

On the other hand, even in the case of a rotating electrical machine that uses a non-contact bearing, various technologies for minimizing the displacement of the rotating shaft in the axial direction have already been proposed. As an example of such technologies, a technology of using an active magnetic bearing has been proposed, in which feedback on displacement of the rotating shaft in the axial direction is provided to a coil which generates a magnetic force against displacement in a thrust direction in a thrust magnetic bearing, such that the rotating shaft is maintained in a predetermined axial position (for example, refer to Patent Document 1). Further, as another example, a technology of reinforcing the damper function of a passive magnetic bearing has been proposed (for example, refer to Patent Document 2).

Patent Document 1: Japanese Unexamined Patent Application, Publication No. 2014-126174
Patent Document 2: Japanese Unexamined Patent Application, Publication No. 2008-169965

SUMMARY OF THE INVENTION

According to the technology disclosed in Patent Document 1, even if a force acts on the rotating shaft of the rotating electrical machine to displace in the axial direction, the feedback control can maintain the rotating shaft in an axial position within a prearranged range. Namely, even if a force to displace the rotating shaft in the axial direction acts as a disturbance, this displacement would serve as a controlled deviation, the control would function within a closed loop, and the rotating shaft would remain in an axial position within a prearranged range. However, such a bearing has problems such as being complicated in configuration and expensive in cost. On the other hand, according to the technology disclosed in Patent Document 2, instead of configuring an active control system such as feedback control, damping characteristics based on a damper function are utilized to achieve stabilization at an equilibrium point between a displacing force in the axial direction and a damping force. Therefore, the equilibrium point in this case varies depending on the displacing force in the axial direction. Therefore, in principle, the rotating shaft may not always remain in an axial position within a prearranged range.

The present invention has been made in view of the circumstances as described above, and an object of the present invention is to provide a rotating electrical machine which can be easily configured at low lost, and which can highly accurately maintain an axial position (position in a thrust direction) of a rotating shaft in a prearranged position, and a machine tool, to which the rotating electrical machine is applied.

In the specification of the present application, a "torque generation section" is defined as a section, in which a torque generation member exists in an axial direction of a rotating electrical machine. The torque generation section is a region which mainly contributes to torque generation, and is figuratively illustrated in the drawings as referred below. (1) A rotating electrical machine (e.g., a rotating electrical machine 100, 200, 300 to be described later) according to a first aspect of the present invention is a rotating electrical machine, including: a stator (e.g., a stator 20 to be described later) including a stator core (e.g., a stator core 21 to be described later); and a rotor (e.g., a rotor 10 to be described later) supported on a rotating shaft supported by way of a non-contact bearing, in which a section, in which a torque generation member exists in an axial direction of the rotating electrical machine, is defined as a torque generation section, a first end and a second end of the stator core in the axial direction (e.g., a first end 211 and a second end 212 in the axial direction to be described later) extend outwards in the axial direction from a first end and a second end (e.g., a first end 111 and a second end 112 to be described later) of the torque generation section (e.g., a torque generation section S1 to be described later) in the axial direction.

(2) In a second aspect of the rotating electrical machine according to the first aspect of the present invention, it is preferable that a length of the first end and the second end of the stator core extending outwards in the axial direction, from the first end and the second end of the torque generation section at the rotor side in the axial direction, is longer than a magnetic gap length (e.g., a magnetic gap length Lg to be described later) of the rotating electrical machine.

(3) In a third aspect of the rotating electrical machine according to the first or second aspect of the present invention, it is preferable that, in the rotor, an intermediate position in a span of the torque generation section in the axial direction is the same as an intermediate position in a span of the stator core in the axial direction, in terms of an axial position.

(4) In a fourth aspect of the rotating electrical machine according to any one of the first to third aspects of the present invention, the non-contact bearing may be any one of a magnetic bearing, a fluid bearing, or a hybrid bearing combining the magnetic bearing and the fluid bearing.

(5) In a fifth aspect of the rotating electrical machine according to the fourth aspect of the present invention, the non-contact bearing, which is the magnetic bearing, the fluid bearing, or the hybrid bearing combining the magnetic bearing and the fluid bearing, may be a passive bearing.

(6) A sixth aspect of the present invention is a machine tool including the rotating electrical machine according to any one of first to fifth aspects of the present invention.

The present invention can embody a rotating electrical machine which can be easily configured at low lost, and which can highly accurately maintain an axial position (position in a thrust direction) of a rotating shaft in a prearranged position, and a machine tool, to which the rotating electrical machine is applied.

DETAILED DESCRIPTION OF THE INVENTION

Figure 1:
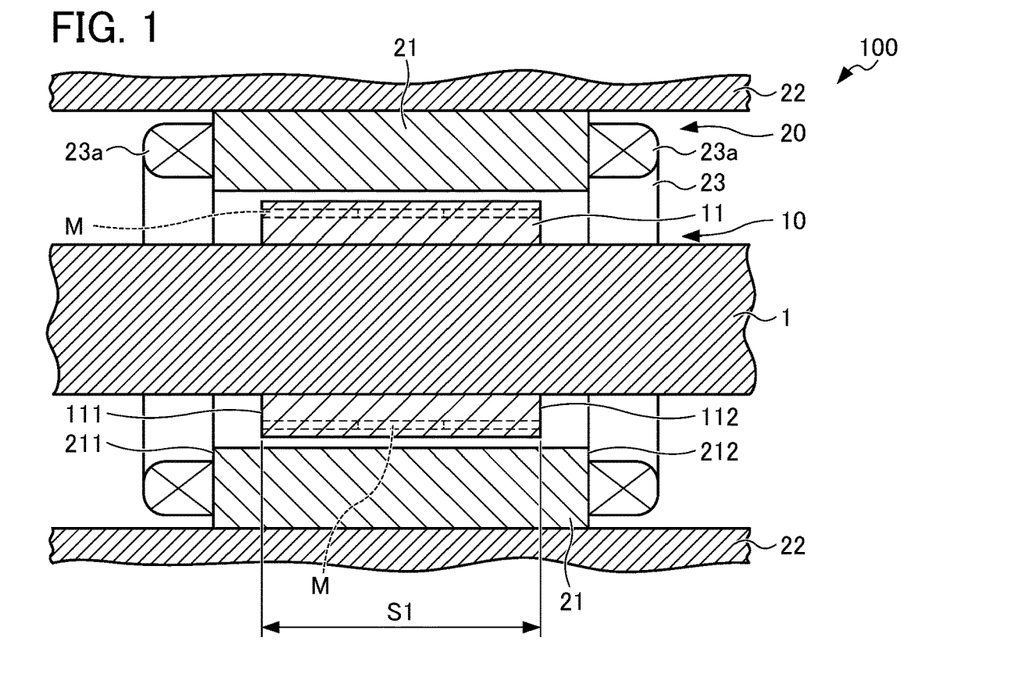
FIG. 1 is a diagram illustrating a schematic configuration of an interior permanent-magnet synchronous motor as an embodiment of a rotating electrical machine of the present invention.

A rotating electrical machine according to an embodiment of the present invention is hereinafter described with reference to the drawings, in comparison with a conventional typical rotating electrical machine, as appropriate. FIG. 1 is a diagram illustrating a schematic configuration of an interior permanent-magnet synchronous motor as an embodiment of a rotating electrical machine of the present invention. Note that a non-contact bearing applied to an embodiment of the present invention to be described below includes a fluid bearing as well. In other words, a fluid bearing is supported by way of a fluid as a medium, and strictly speaking, the bearing is in contact with the medium; and the shaft is floating in the fluid, as compared to a bearing having a mechanical contact, such as a ball bearing; and in this regard, the non-contact bearing is used as encompassing the liquid bearing. Examples of the medium applied to the fluid bearing include air, oil, and other viscous fluids. Examples of the fluid bearing using such a medium include an air hydrostatic bearing, a slide bearing, or a hydrodynamic bearing using oil or air as a medium. In an interior permanent-magnet synchronous motor 100, a rotator 10 is supported by way of a rotating shaft 1, both end sides of which are supported by way of a non-contact bearing (not illustrated). A stator 20 is provided so as to surround the rotor 10. The stator 20 includes a stator core 21 formed by laminating, for example, thin magnetic steel sheets, and is incorporated in a housing 22. A coil 23 is wound on the stator core 21. A coil end 23a of the coil 23 wound on the stator core 21 is visible in the perspective of FIG. 1.

A wiring (not illustrated), which is electrically connected to the coil 23, is drawn out from the stator 20, passed through a through-hole provided to the housing 22, and connected to a power source (not illustrated) installed outside of the interior permanent-magnet synchronous motor 100. As a result, the power source supplies the coil 23 with electric power for actuation.

The rotor core 11, which is a rotating member of the rotor 10, is fitted to the rotating shaft 1 by way of interference fit or the like, so as to have sufficient holding power. In the rotor core 11, a permanent magnet M, which is composed of magnet segments at least circumferentially divided into plural magnets, is embedded and held in a magnet slot (not illustrated).

In the case of the interior permanent-magnet synchronous motor 100 illustrated in FIG. 1, a section of the rotor 10 in the axial direction, in which the permanent magnet M is embedded, is a section which mainly contributes to torque generation, and is referred to as a torque generation section S1.

As will be easily understood in view of FIG. 1, in the interior permanent-magnet synchronous motor 100, a first end 211 and a second end 212 of the stator core 21 in the axial direction extend outwards in the axial direction from a first end 111 and a second end 112 of the torque generation section S1 at the rotor 10 side in the axial direction, respectively.

In this case, as will be described later with reference to the drawings, the length of the first end 211 and the second end 212 of the stator core 21 extending outwards in the axial direction, from the first end 111 and the second end 112 of the torque generation section S1 in the axial direction at the rotor 10 side, is longer than a magnetic gap length Lg of the interior permanent-magnet synchronous motor 100.

Further, in the rotor 10, an intermediate position (middle position) in the span of the torque generation section S1 in the axial direction is the same as an intermediate position (middle position) in the span of the stator core 21 in the axial direction, in terms of the axial position.

In the interior permanent-magnet synchronous motor 100, the non-contact bearing at both ends of the rotating shaft 1 may be any one of a magnetic bearing, a fluid bearing, or a hybrid bearing combining the magnetic bearing and the fluid bearing. Further, in particular, these types of non-contact bearings may be a passive bearing. In the interior permanent-magnet synchronous motor 100 as an embodiment of the rotating electrical machine of the present invention described above with reference to FIG. 1, displacement of the rotating shaft 1 in the axial direction is suppressed, and the axial position thereof is stably maintained in a normal position, as will be described later with reference to FIGS. 7 to 11.

Figure 2:
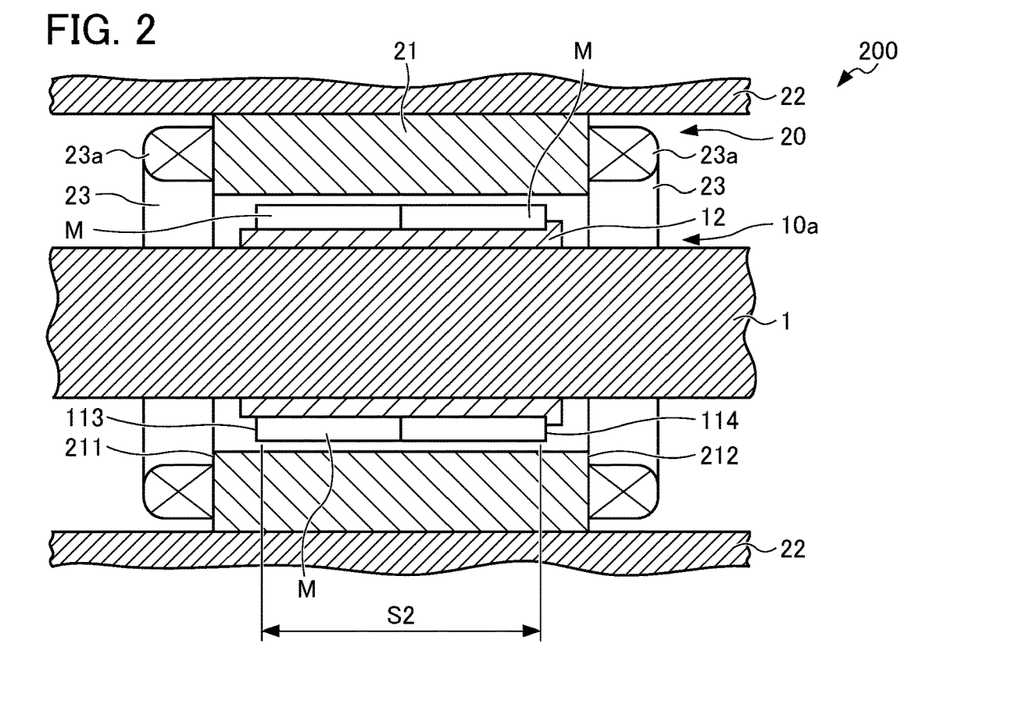
FIG. 2 is a diagram illustrating a schematic configuration of a surface-mounted permanent-magnet synchronous motor as another embodiment of the rotating electrical machine of the present invention.

Referring now to FIG. 2, a surface-mounted permanent-magnet synchronous motor as another embodiment of the rotating electrical machine of the present invention is described. FIG. 2 is a diagram illustrating a schematic configuration of the surface-mounted permanent-magnet synchronous motor as another embodiment of the rotating electrical machine of the present invention. Members in FIG. 2 corresponding to those in FIG. 1 are denoted by the same reference numbers, and individual descriptions of these corresponding members are omitted herein. As will be easily understood in view of FIG. 2 in comparison with FIG. 1, the stator 20 is the same as the stator 20 of the interior permanent-magnet synchronous motor 100 illustrated in FIG. 1. In terms of a difference between the interior permanent-magnet synchronous motor 100 illustrated in FIG. 1 and the surface-mounted permanent-magnet synchronous motor 200 illustrated in FIG. 2, the magnet M is buried and fixed inside the rotor core 11 in the rotor 10 of the interior permanent-magnet synchronous motor 100; whereas the permanent magnet M is fixed to the rotating shaft 1 by way of a rotary sleeve 12 in the surface-mounted permanent-magnet synchronous motor 200. Namely, in the surface-mounted permanent-magnet synchronous motor 200 illustrated in FIG. 2, the cylindrical rotary sleeve 12 composed of a magnetic metallic material is press-fitted between an annular permanent magnet M and the rotating shaft 1, whereby the permanent magnet M is firmly held to an outer periphery of the rotating shaft 1. However, the cylindrical rotary sleeve 12 as illustrated in FIG. 2 may not necessarily be used, and the permanent magnet M may be attached to the outer periphery of rotating shaft 1 without using such a rotary sleeve 12.

In the case of the surface-mounted permanent-magnet synchronous motor 200 illustrated in FIG. 2, a section of a rotor 10a in the axial direction, in which the permanent magnet M is provided, is a section which mainly contributes to torque generation, and is referred to as a torque generation section S2.

As will be easily understood in view of FIG. 2, in the surface-mounted permanent-magnet synchronous motor 200, the first end 211 and the second end 212 of the stator core 21 in the axial direction extend outwards in the axial direction from a first end 113 and a second end 114 of the torque generation section S2 at the rotor 10a side in the axial direction, respectively.

In this case, as will be described later with reference to the drawings, the length of the first end 211 and the second end 212 of the stator core 21 extending outwards in the axial direction, from the first end 113 and the second end 114 of the torque generation section S2 in the axial direction at the rotor 10a side, is longer than a magnetic gap length Lg of the surface-mounted permanent-magnet synchronous motor 200.

Further, in the rotor 10a, an intermediate position (middle position) in the span of the torque generation section S2 in the axial direction is the same as an intermediate position (middle position) in the span of the stator core 21 in the axial direction, in terms of the axial position.

In the surface-mounted permanent-magnet synchronous motor 200, the non-contact bearing at both ends of the rotating shaft 1 may be any one of a magnetic bearing, a fluid bearing, or a hybrid bearing combining the magnetic bearing and the fluid bearing. Further, in particular, these types of non-contact bearings may be a passive bearing. In the surface-mounted permanent-magnet synchronous motor 200 as an embodiment of the rotating electrical machine of the present invention described above with reference to FIG. 2, displacement of the rotating shaft 1 in the axial direction is suppressed, and the axial position thereof is stably maintained in a normal position, as will be described later with reference to FIGS. 7 to 11.

Figure 3:
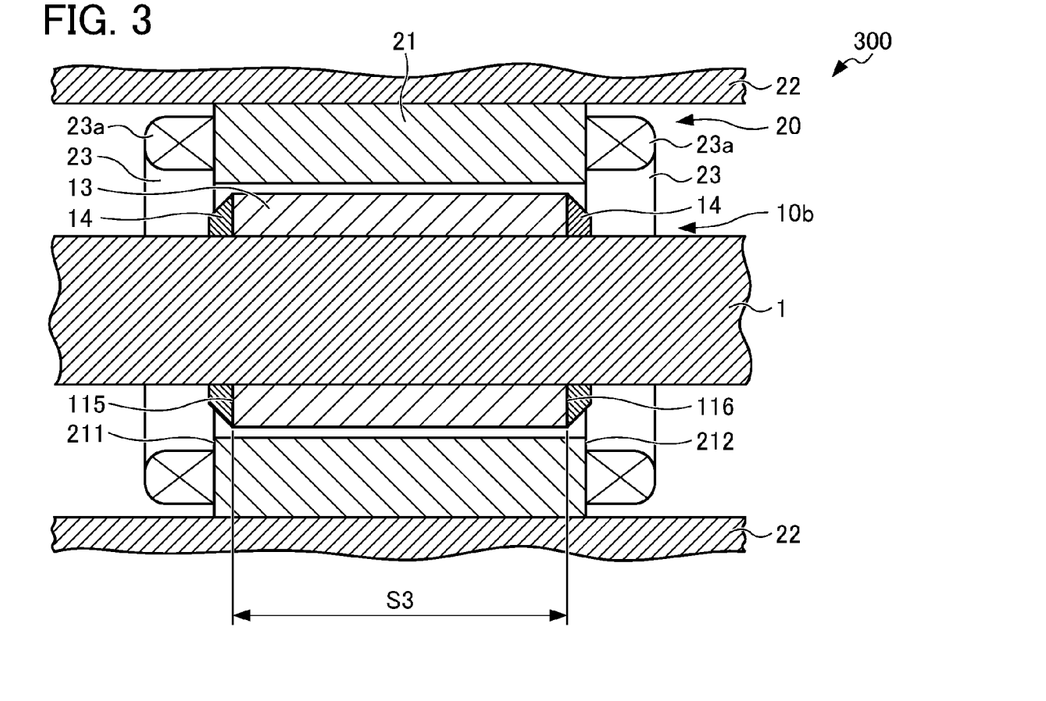
FIG. 3 is a diagram illustrating a schematic configuration of an induction motor as a still another embodiment of the rotating electrical machine of the present invention.

Referring now to FIG. 3, an induction motor as still another embodiment of the rotating electrical machine of the present invention is described. FIG. 3 is a diagram illustrating a schematic configuration of the induction motor as the still another embodiment of the rotating electrical machine of the present invention. Members in FIG. 3 corresponding to those in FIGS. 1 and 2 are denoted by the same reference numbers, and individual descriptions of these corresponding members are omitted herein. As will be easily understood in view of FIG. 2 in comparison with FIGS. 1 and 2, in the case of the induction motor 300 as well, the stator 20 is the same as the stator 20 of the interior permanent-magnet synchronous motor 100 illustrated in FIG. 1 and the surface-mounted permanent-magnet synchronous motor 200 illustrated in FIG. 2. In terms of a difference of the induction motor 300 illustrated in FIG. 3 from the interior permanent-magnet synchronous motor 100 illustrated in FIG. 1 and the surface-mounted permanent-magnet synchronous motor 200 illustrated in FIG. 2, the rotor 10b is composed of a rotor core 13 including an end ring (short-circuit ring) 14 at both ends thereof in the axial direction.

In the case of the induction motor 300 illustrated in FIG. 3, a section of a rotor 10b in the axial direction, in which the rotor core 13 is provided, is a section which mainly contributes to torque generation, and is referred to as a torque generation section S3.

As will be easily understood in view of FIG. 3, in the induction motor 300, the first end 211 and the second end 212 of the stator core 21 in the axial direction extend outwards in the axial direction from a first end 115 and a second end 116 of the torque generation section S3 at the rotor 10b side in the axial direction, respectively.

In this case, as will be described later with reference to the drawings, the length of the first end 211 and the second end 212 of the stator core 21 extending outwards in the axial direction, from the first end 115 and the second end 116 of the torque generation section S3 in the axial direction at the rotor 10b side, is longer than a magnetic gap length Lg of the induction motor 300.

Further, in the rotor 10b, an intermediate position (middle position) in the span of the torque generation section S3 in the axial direction is the same as an intermediate position (middle position) in the span of the stator core 21 in the axial direction, in terms of the axial position.

In the induction motor 300, the non-contact bearing at both ends of the rotating shaft 1 may be any one of a magnetic bearing, a fluid bearing, or a hybrid bearing combining the magnetic bearing and the fluid bearing. Further, in particular, these types of non-contact bearings may be a passive bearing. In the induction motor 300 as an embodiment of the rotating electrical machine of the present invention described above with reference to FIG. 3, displacement of the rotating shaft 1 in the axial direction is suppressed, and the axial position thereof is stably maintained in a normal position, as will be described later with reference to FIGS. 7 to 11. Further, the rotating electrical machine of any one of the interior permanent-magnet synchronous motor 100 illustrated in FIG. 1, the surface-mounted permanent-magnet synchronous motor 200 illustrated in FIG. 2, and the induction motor 300 illustrated in FIG. 3 can be used for driving a machine tool so as to configure a highly accurate and inexpensive machine tool as a whole.

Figure 8:
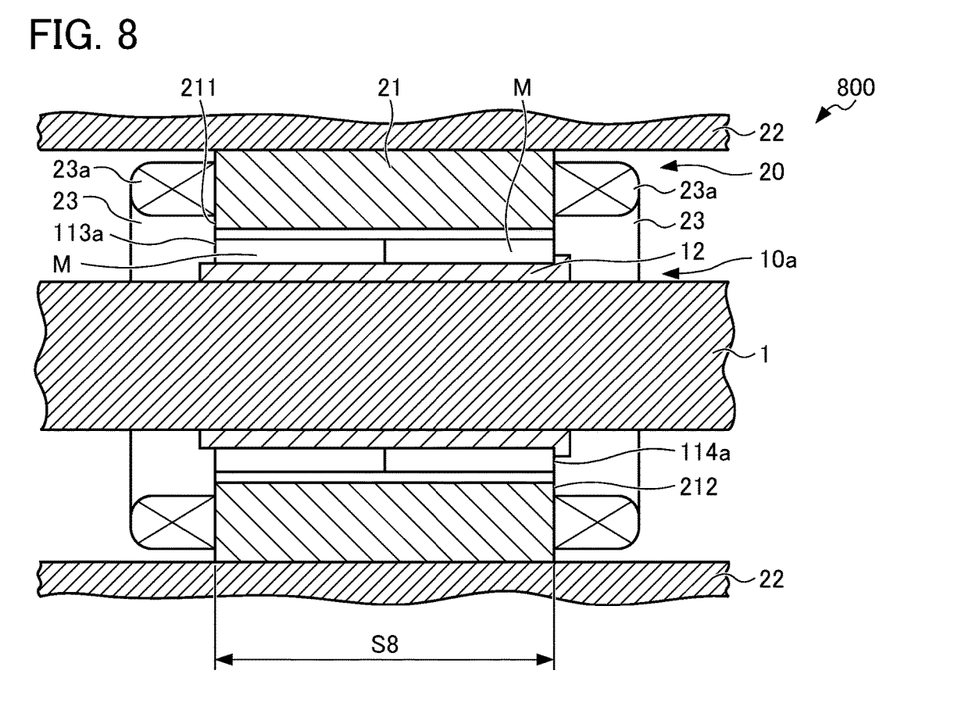
FIG. 8 is a diagram illustrating a schematic configuration of an electric motor as a typical rotating electrical machine.

Prior to describing the function of the rotating electrical machine of the present invention with reference to FIGS. 1 to 3, referring now to FIG. 8, a typical rotating electrical machine is described in comparison with the rotating electrical machine of the present invention. FIG. 8 is a diagram illustrating a schematic configuration of an electric motor as a typical rotating electrical machine. Although a surface-mounted permanent-magnet synchronous motor is described as a typical rotating electrical machine, the portions, to which attention should be paid herein, exhibit similar phenomena as in the case of the interior permanent-magnet synchronous motor or the induction motor. In a surface-mounted permanent-magnet synchronous motor 800, a rotator 10a is supported by way of a rotating shaft 1, both end sides of which are supported by way of a non-contact bearing (not illustrated). A stator 20 is provided so as to surround the rotor 10s. The stator 20 includes a stator core 21 formed by laminating, for example, thin magnetic steel sheets, and is incorporated in a housing 22. A coil 23 is wound on the stator core 21. A coil end 23a of the coil 23 wound on the stator core 21 is visible in the perspective of FIG. 1.

In the surface-mounted permanent-magnet synchronous motor 800 illustrated in FIG. 8, the cylindrical rotary sleeve 12 composed of a magnetic metallic material is press-fitted between an annular permanent magnet M and the rotating shaft 1, whereby the permanent magnet M is firmly held to an outer periphery of the rotating shaft 1.

In the case of the surface-mounted permanent-magnet synchronous motor 800 illustrated in FIG. 8, a section of the rotor 10a in the axial direction, in which the permanent magnet M is provided, is a section which mainly contributes to torque generation, and is referred to as a torque generation section S8.

As will be easily understood in view of FIG. 8, in the surface-mounted permanent-magnet synchronous motor 800, the axial position of the first end 211 and the second end 212 of the stator core 21 in the axial direction is substantially the same as the axial position of a first end 113a and a second end 114a of the torque generation section S2 at the rotor 10a side in the axial direction.

In the case of a typical rotating electrical machine represented by the surface-mounted permanent-magnet synchronous motor 800 illustrated in FIG. 8, the problems as described above may occur. These problems are further specifically described with reference to FIG. 8.

In general, the length of the stator core of the rotating electrical machine in the axial direction is designed to be the same as the length of the torque generation section of the rotor in the axial direction, as in the case of the surface-mounted permanent-magnet synchronous motor 800 illustrated in FIG. 8. Note that, precisely speaking, even if designed to have the same length as described above, a slight difference in length may be provided to a degree that would absorb errors (dimensional tolerance) in the total length at the time of manufacturing. In this case, any one of the rotor or the stator is manufactured to be slightly longer to a degree that would absorb errors (dimensional tolerance) in the total length, within the limit that would absorb the dimensional tolerance. This is fundamentally different from the difference in the length of the stator core and the torque generation in the axial direction section according to the technical concept of the present invention, in terms of the configuration (degree of difference), functions and effects.

In the case of the surface-mounted permanent-magnet synchronous motor 800 illustrated in FIG. 8, the rotor does not have a core, and a torque generation section S8 is a section in the axial direction, in which the magnets are arranged on the surface of the rotor. Since a magnetic flux is constantly generated in a synchronous motor having magnets, a force is constantly generated in the axial direction at both ends of the stator core and the rotor core.

Figure 9:
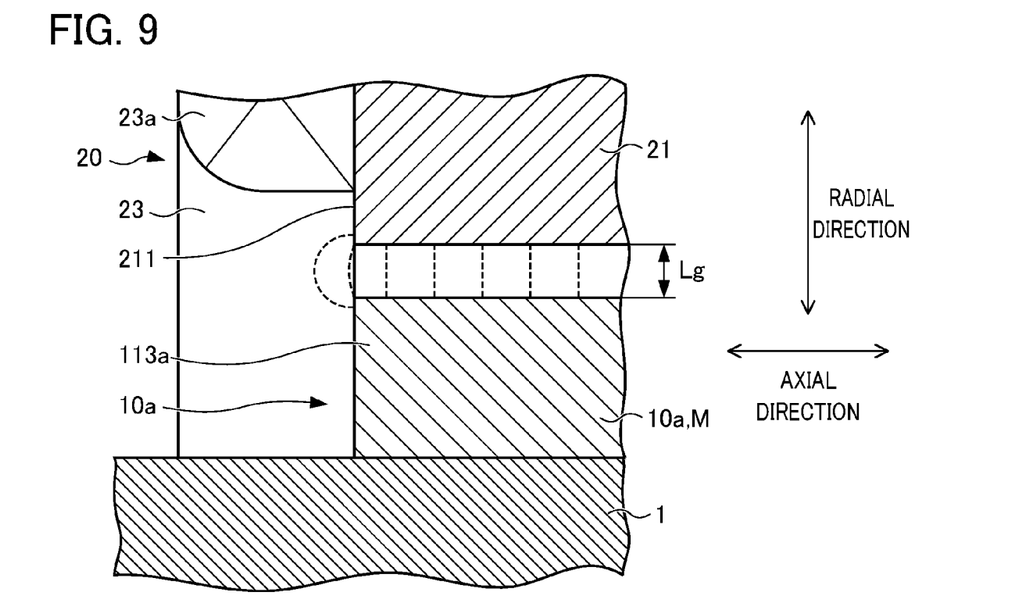
FIG. 9 is a schematic diagram figuratively illustrating an aspect of the lines of magnetic flux at the end, in a cross section along a rotating shaft of a typical rotating electrical machine, and illustrates, in particular, the case in which the end of the stator core is aligned with the end of the torque generation section at the rotor side.
Figure 10:
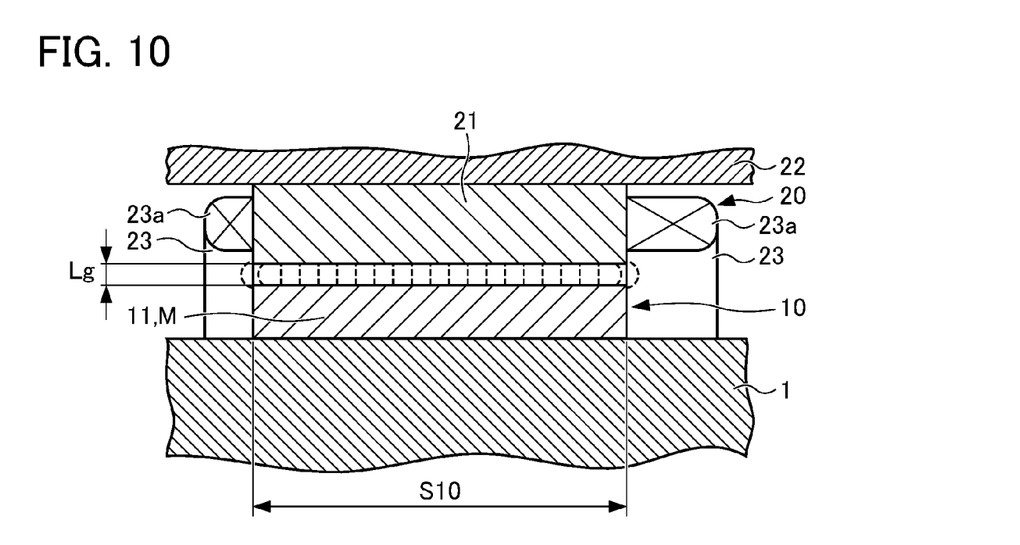
FIG. 10 is a schematic diagram figuratively illustrating an aspect of the lines of magnetic flux at the end, in a cross section along a rotating shaft of a typical rotating electrical machine, and illustrates, in particular, the case in which the length of the stator core is equal to the length of the torque generation section at the rotor side, and the intermediate position in the span of the stator core in the axial direction is the same as the intermediate position in the span of the torque generation section at the rotor side in the axial direction, in terms of the axial position.
Figure 11:
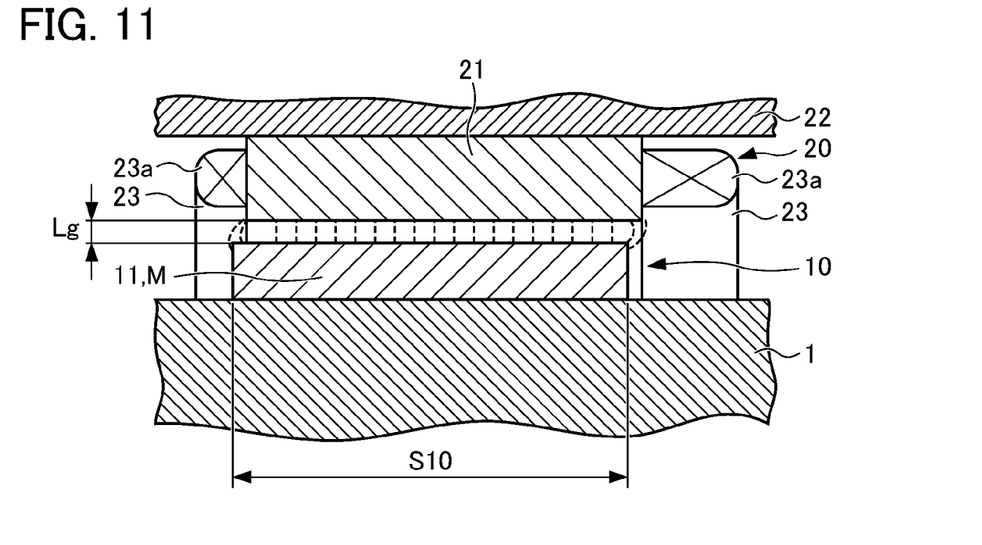
FIG. 11 is a schematic diagram figuratively illustrating an aspect of the lines of magnetic flux at the end, in a cross section along a rotating shaft of a typical rotating electrical machine, and illustrates, in particular, the case in which the length of the stator core is equal to the length of the torque generation section at the rotor side, and the intermediate position in the span of the stator core in the axial direction is not aligned with the intermediate position in the span of the torque generation section at the rotor side in the axial direction.

Referring now to FIGS. 9 to 11, a force acting on both ends of the stator core and the rotor core in the axial direction is described. FIG. 9 is a schematic diagram figuratively illustrating an aspect of the lines of magnetic flux at the end, in a cross section along a rotating shaft of a typical rotating electrical machine, an example of which is the surface-mounted permanent-magnet synchronous motor 800 illustrated in FIG. 8. In particular, this schematic diagram illustrates the case in which the end of the stator core is aligned with the end of the torque generation section at the rotor side. FIG. 10 is a schematic diagram figuratively illustrating an aspect of the lines of magnetic flux at the end, in a cross section along a rotating shaft of a typical rotating electrical machine, an example of which is the surface-mounted permanent-magnet synchronous motor 800 illustrated in FIG. 8; and in particular, FIG. 10 illustrates the case in which the length of the stator core is equal to the length of the torque generation section at the rotor side, and the intermediate position in the span of the stator core in the axial direction is the same as the intermediate position in the span of the torque generation section at the rotor side in the axial direction, in terms of the axial position. FIG. 11 is a schematic diagram figuratively illustrating an aspect of the lines of magnetic flux at the end, in a cross section along a rotating shaft of a typical rotating electrical machine, an example of which is the surface-mounted permanent-magnet synchronous motor 800 illustrated in FIG. 8; and in particular, FIG. 11 illustrates the case in which the length of the stator core is equal to the length of the torque generation section at the rotor side, and the intermediate position in the span of the stator core in the axial direction is not aligned with the intermediate position in the span of the torque generation section at the rotor side in the axial direction.

In FIGS. 9 to 11, members corresponding to those illustrated in FIG. 8 are denoted by the same reference numbers. In FIGS. 9 to 11, the reference numbers in the surface-mounted permanent-magnet synchronous motor 800 illustrated in FIG. 8 are used for convenience; and FIG. 9 illustrates the first end 211 of the stator core as well as the first end 113*a* of the rotor 10*a* in the axial direction (namely, the first end of the magnet M), whereas FIGS. 10 and 11 illustrate the second ends thereof in the axial direction. Further, a torque generation section S10 at the rotor side illustrated in FIGS. 10 and 11 corresponds to the torque generation section S8 illustrated in FIG. 8. In FIGS. 10 and 11, the torque generation section is denoted by S10, for the convenience of describing similar phenomena, which are common to the surface-mounted permanent-magnet synchronous motor 800 and a typical interior permanent-magnet synchronous motor (not illustrated).

In FIGS. 9 to 11, an inner periphery of the stator core 21 closely faces an outer periphery of the rotor 10*a*, across the magnetic gap having a magnetic gap length Lg. The broken lines illustrate the lines of magnetic flux in the magnetic gap.

The lines of magnetic flux have a property to repel each other in the same orientation, creating a repulsive force to be spaced apart. Therefore, the lines of magnetic flux emitted from one end of the magnet M are radiated towards the space while enlarging the distance from each other.

On the other hand, the lines of magnetic flux have a property to create an attractive force, so as to constantly minimize the distance between the base of the magnetic material emitting the lines of magnetic flux, and the base of the magnetic material at the destination.

When the magnetic properties such as magnetic resistance, etc. of the magnetic materials generating or receiving the lines of magnetic flux are uniform, and the intensity of the magnetic field is also uniform, the bases of the lines of magnetic flux emitted from the surface of the magnetic material have a property to be aligned at an equal interval. Namely, the magnetic flux density is uniform in the surface of the magnetic material.

By referring to FIGS. 9 to 11, based on the above-described properties of the lines of magnetic flux, the magnetic force from both ends of the magnet in the axial direction is not exerted inside of the magnetic gap in the axial direction, in which the lines of magnetic flux are aligned at an equal interval. On the other hand, although the above-described attractive force acts on the stator core 21 and the rotor 10*a* (the magnet M in the example illustrated in FIG. 8), the stator core 21 and the rotor 10*a* are supported so as not to move in the direction of the attraction force, and therefore do not abut with each other. When an electric current is applied to the coil 23, the lines of magnetic flux twist in a direction orthogonal to the surface of the page on which the drawings are depicted, thereby generating torque by virtue of the above-described attractive force. In this case, due to the mutual repulsive force, the lines of magnetic flux tend to swell out outwards at the first end 211 of the stator core and the first end 113*a* of the rotor 10*a* in the axial direction. Since the second end has a similar tendency (refer to FIG. 10), the equilibrium of the lines of magnetic flux between both ends is not broken, and a force is not generated in the axial direction. Therefore, a force is only generated in the radial direction from the above-described attractive force.

Here, assuming arguendo that the axial positions of the ends of the two cores deviate from each other in the axial direction as illustrated in FIG. 11, a force will be generated in the axial direction so as to dissolve the deviation and align the end positions. Namely, when the two cores have the same total length in the axial direction, and deviate from each other in the axial direction, a force constantly acts in the axial direction so as to align the axial positions of the two cores.

Further, in the case of the interior permanent-magnet synchronous motor as well, similar to the induction motor, the rotor also includes a core, and the torque generation section of the rotor is equal in length to the section over the total length of the rotor core. As described above, since the magnetic flux is constantly generated in a synchronous motor having magnets, a force is constantly generated in the axial direction at both ends of the stator core and the rotor core. Therefore, assuming arguendo that the axial positions of the ends of the two cores deviate from each other in the axial direction, a force will be generated in the axial direction so as to dissolve the deviation and align the end positions. Namely, when the two cores have the same total length in the axial direction, and deviate from each other in the axial direction, a force constantly acts in the axial direction so as to align the axial positions of the two cores.

Further, in the case of the induction motor, the rotor also includes a core, and the length of the torque generation section is equal to the length of the rotor core in the axial direction. When torque is generated, a magnetic attractive force is generated between the stator core and the rotor core in the rotating direction, thereby generating the torque. Concurrently, if the axial positions of the ends of the two cores deviate from each other in the axial direction, a force will be generated in the axial direction so as to dissolve the deviation and align the end positions. Namely, when the two cores have the same total length in the axial direction, and deviate from each other in the axial direction, a force acts in the axial direction so as to align the axial positions of the two cores. However, in the case of the induction motor, this force is only generated while the induction motor is generating torque.

As described above, in any of the cases of the surface-mounted permanent-magnet synchronous motor, the interior permanent-magnet synchronous motor, and the induction motor, if the end of the stator or the end of the torque generation section is tilted in some degree in relation to the rotating shaft due to assembly errors when manufactured, the above-described force to dissolve the deviation in the axial direction will be repeatedly strengthened or weakened, and fluctuate during the rotation. Therefore, the fluctuation in the force causes minute vibrations of the rotating shaft in the axial direction.

As described above, when vibration in the axial direction as described above is transmitted to the rotating shaft of the rotating electrical machine, which is connected to a spindle of a machine tool used for precision processing, even if the vibration is minute, the processing accuracy will be deteriorated, leading to non-negligible circumstances. In other words, such movement of the shaft in the axial direction affects the processing accuracy, and is therefore unfavorable. Further, in particular, a bearing such as a non-contact bearing, a magnetic bearing or a fluid bearing, which has low support stiffness, is likely to be significantly affected by such problems. Furthermore, if a passive bearing, which does not have any positioning function for axial positions, is used as a bearing of a rotating shaft, the problem will become significant.

Typical rotating electrical machine may be affected by the problems as described above; whereas the rotating electrical machine of the present invention has sufficiently solved the problems. Next, the functions of the rotating electrical machine as an embodiment of the present invention illustrated in FIGS. 1 to 3 are sequentially described with reference to FIGS. 4 to 7.

Figure 4:
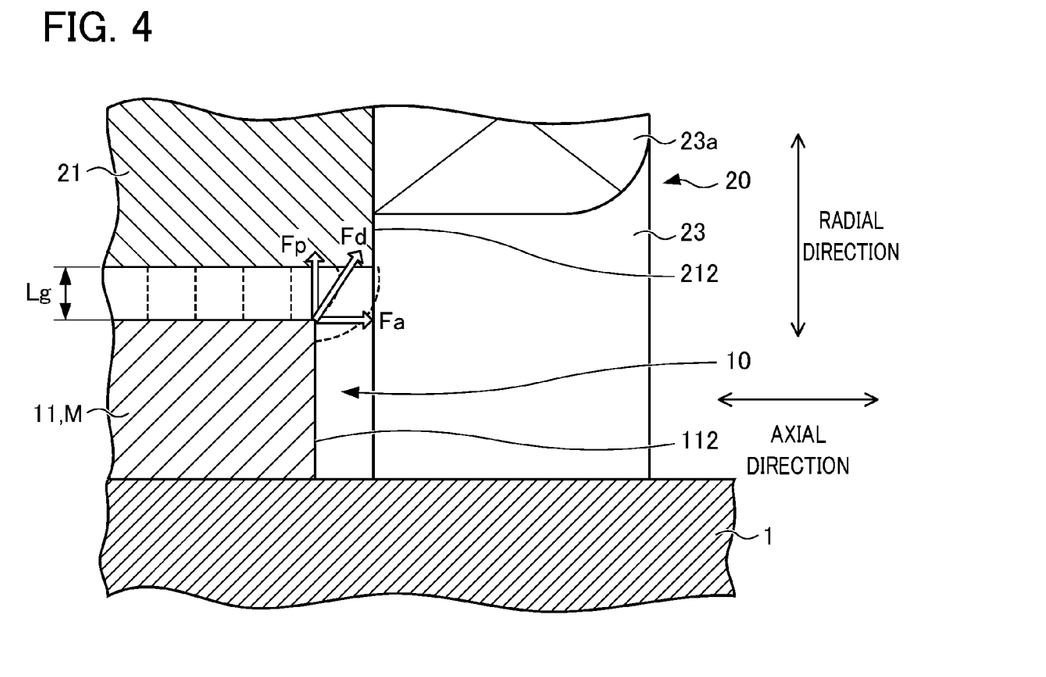
FIG. 4 is a schematic diagram figuratively illustrating an aspect of the lines of magnetic flux at the end, in a cross section along a rotating shaft of the rotating electrical machine illustrated in FIGS. 1 to 3, and illustrates, in particular, the case in which the end of the torque generation section at the rotor side is deviated towards the stator core side, in relation to the end of the rotor core side.
Figure 5:
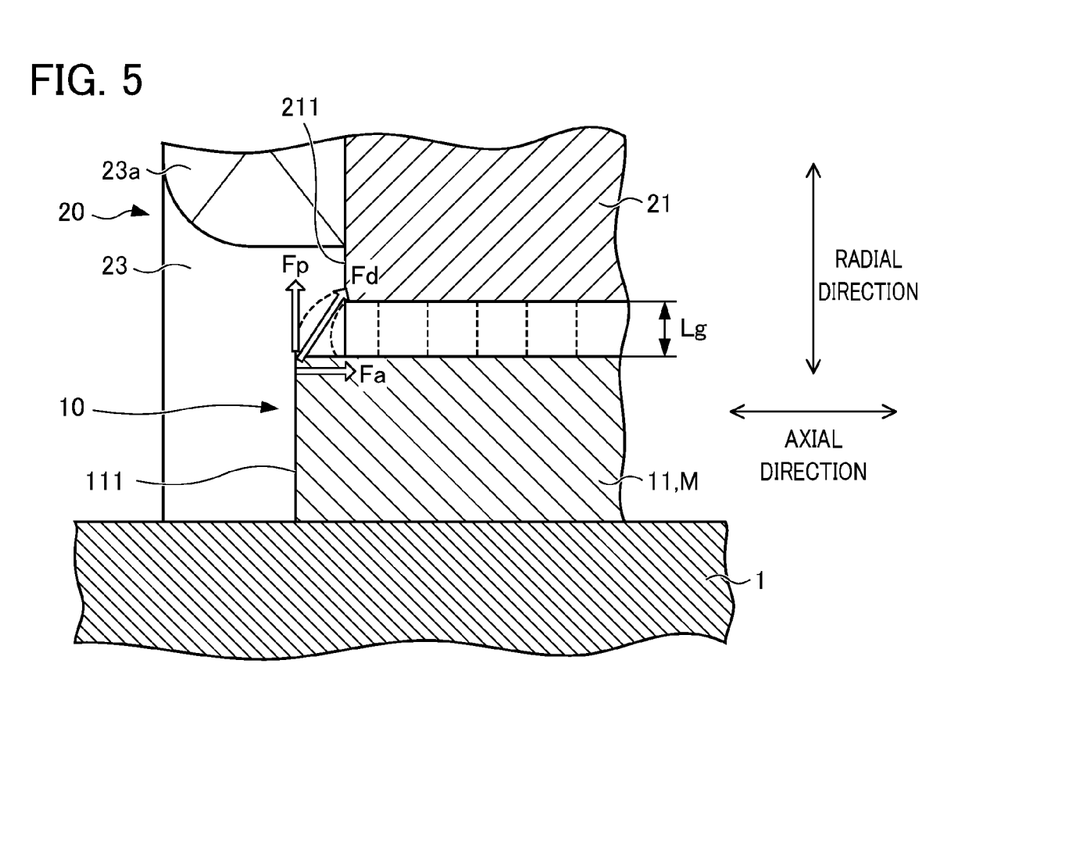
FIG. 5 is a schematic diagram figuratively illustrating an aspect of the lines of magnetic flux at the end, in a cross section along the rotating shaft of the rotating electrical machine illustrated in FIGS. 1 to 3, and illustrates, in particular, an assumption that the end of the torque generation section at the rotor side is deviated outwards from the stator, in relation to the end of the rotor core side.

FIG. 4 is a schematic diagram figuratively illustrating an aspect of the lines of magnetic flux at the end, in a cross section along the rotating shaft of the rotating electrical machine illustrated in FIGS. 1 to 3, and illustrates, in particular, the case in which the end of the torque generation section at the rotor side is deviated towards the stator core side, in relation to the end of the rotor core side. FIG. 5 is a schematic diagram figuratively illustrating an aspect of the lines of magnetic flux at the end, in a cross section along the rotating shaft of the rotating electrical machine illustrated in FIGS. 1 to 3

FIG. 5, in particular, illustrates the case in which the end of the torque generation section at the rotor side is deviated outwards from the rotor core, in relation to the end of the stator core.

In FIGS. 4 and 5, members corresponding to those illustrated in FIGS. 1 to 3 are denoted by the same reference numbers. However, illustrations in FIGS. 4 and 5 are common to the interior permanent-magnet synchronous motor of FIG. 1, the surface-mounted permanent-magnet synchronous motor of FIG. 2, and the induction motor of FIG. 3; therefore, the shapes in detail, etc. are appropriately omitted or figuratively illustrated for the purpose of convenience, and most of the reference numbers are common to those in FIG. 1.

FIG. 4 illustrates the case in which the end of the torque generation section at the rotor 10 side (in this example, the second end 112 of the rotor core 11) is deviated to the stator core 21 side, in relation to the second end 212 of stator core 21. At this time, inside the magnetic gap having the magnetic gap length Lg between the stator core 21 and the torque generation section as opposed (the rotor core 11, the magnet M) at the rotor 10 side, the magnetic force from both ends of the magnet in the axial direction is not exerted inside of the magnetic gap in the axial direction, and the lines of magnetic flux are aligned at an equal interval. On the other hand, although the above-described attractive force acts on the lines of magnetic flux, the stator core 21 and the rotor 10 (the rotor core 11 in the example illustrated in FIG. 1, the permanent magnet M in the example illustrated in FIG. 2) are supported so as not to move in the direction of the attraction force, and therefore do not abut with each other. When an electric current is applied to the coil 23, the lines of magnetic flux twist in the direction orthogonal to the surface of the page on which the drawings are depicted, thereby generating torque by virtue of the above-described attractive force. Here, descriptions are provided on the relationship between the magnetic gap length Lg and the length of the first end 211 and the second end 212 of the stator core 21 extending outwards in the axial direction, from the first end 111 and the second end 112 of the torque generation section S1 in the axial direction at the rotor 10 side. Namely, in the case of the interior permanent-magnet synchronous motor 100 illustrated in FIG. 1, as described above, the length of the first end 211 and the second end 212 of the stator core 21 extending outwards in the axial direction, from the first end 111 and the second end 112 of the torque generation section S1 in the axial direction at the rotor 10 side, is longer than the magnetic gap length Lg of the interior permanent-magnet synchronous motor 100. Such a length of the first end 211 and the second end 212 of the stator core 21 extending outwards in the axial direction is similar in the cases of the surface-mounted permanent-magnet synchronous motor 200 of FIG. 2 and the induction motor 300 of FIG. 3.

In the rotating electrical machine 100 of the present embodiment, the first end 211 and the second end 212 of the stator core 21 in the axial direction extend outwards in the axial direction from the first end 111 and the second end 112 of the torque generation section S1 at the rotor 10 side in the axial direction, respectively. Therefore, in view of FIG. 4 illustrating the end, the lines of magnetic flux are tilted at the second end 112 of the rotor 10. When the lines of magnetic flux are tilted in this manner, since the lines of magnetic flux have a property to generate the above-described attractive force, a force in the axial direction acts on the rotor 10. When a force Fd in the direction of tilt is resolved into a component Fa in the axial direction and a component Fp in a direction orthogonal to the axial direction, this force corresponds to the component Fa in the axial direction. This phenomenon occurs similarly at the first end 211 that is not illustrated in FIG. 4. Therefore, the component Fa (−Fa) of the above-described force Fd in the axial direction acts between the first end 211 and the second end 212 of the stator core 21 in the axial direction and the corresponding first end 111 and second end 112 of the torque generation section S1 at the rotor 10 side in the axial direction. Therefore, by virtue of the force balance between the components Fa and −Fa of the force, the axial position of the rotor 10 and the rotating shaft 1, the relative position of which is fixed to the rotor 10, is stably maintained in the normal position. In other words, the force constantly acts in the direction so as to dissolve the positional deviation in relation to the axial positions of the ends of the rotating shaft 1 and the rotor 10.

FIG. 5 is a diagram illustrating an assumption that the end of the torque generation section at the rotor 10 side (in this example, the first end 111 of the rotor core 11) is deviated outwards from the stator, in relation to the first end 211 of stator core 21. At this time, inside the magnetic gap having the magnetic gap length Lg between the stator core 21 and the torque generation section opposed thereto (the rotor core 11, the magnet M) at the rotor 10 side, the magnetic force from both ends of the magnet in the axial direction is not exerted inside of the magnetic gap in the axial direction, and the lines of magnetic flux are aligned at an equal interval. On the other hand, although the above-described attractive force acts on the lines of magnetic flux, the stator core 21 and the rotor 10 (the rotor core 11 in the example illustrated in FIG. 1, the permanent magnet M in the example illustrated in FIG. 2) are supported so as not to move in the direction of the attraction force, and therefore do not abut with each other. When an electric current is applied to the coil 23, the lines of magnetic flux twist in the direction orthogonal to the surface of the page on which the drawings are depicted, thereby generating torque by virtue of the above-described attractive force.

In the assumption illustrated in FIG. 5, the first end 211 of the stator core 21 in the axial direction retreats inwards in the axial direction from the first end 111 of the torque generation section S1 at the rotor 10 side in the axial direction. Therefore, in view of FIG. 5 illustrating the end, the lines of magnetic flux are tilted at the first end 111 of the rotor 10. When the lines of magnetic flux are tilted in this manner, since the lines of magnetic flux have a property to generate the above-described attractive force, a force in the axial direction acts on the rotor 10. When the force Fd in the direction of tilt is resolved into the component Fa in the axial direction and the component Fp in the direction orthogonal to the axial direction, this force corresponds to the component Fa in the axial direction. This phenomenon occurs similarly in the case in which the stator core 21 of the second end 212, which is not illustrated in FIG. 5, retreats from the second end 112 of the torque generation section S1 at the rotor 10 side in the axial direction, similar to the first end 211. Therefore, the component Fa (−Fa) of the above-described force Fd in the axial direction acts between the first end 211 and the second end 212 of the stator core 21 in the axial direction and the corresponding first end 111 and second end 112 of the torque generation section S1 at the rotor 10 side in the axial direction. Therefore, by virtue of the force balance between the components Fa and −Fa of the force, the axial position of the rotor 10 and the rotating shaft 1, the relative position of which is fixed to the rotor 10, is stably maintained in the normal position.

However, in the case in which the first end 211 of the stator core 21 in the axial direction retreats inwards in the axial direction from the first end 111 of the torque generation section S1 at the rotor 10 side in the axial direction, and the second end 112 does not retreat in a similar manner, the component Fa of the above-described force Fd in the axial direction will constantly act on the rotor 10, and accordingly on the rotating shaft 1, the relative position of which is fixed to the rotor 10. Namely, a force to attract towards the stator core 21 side will constantly act on the rotating shaft 1 and the rotor 10.

Figure 6:
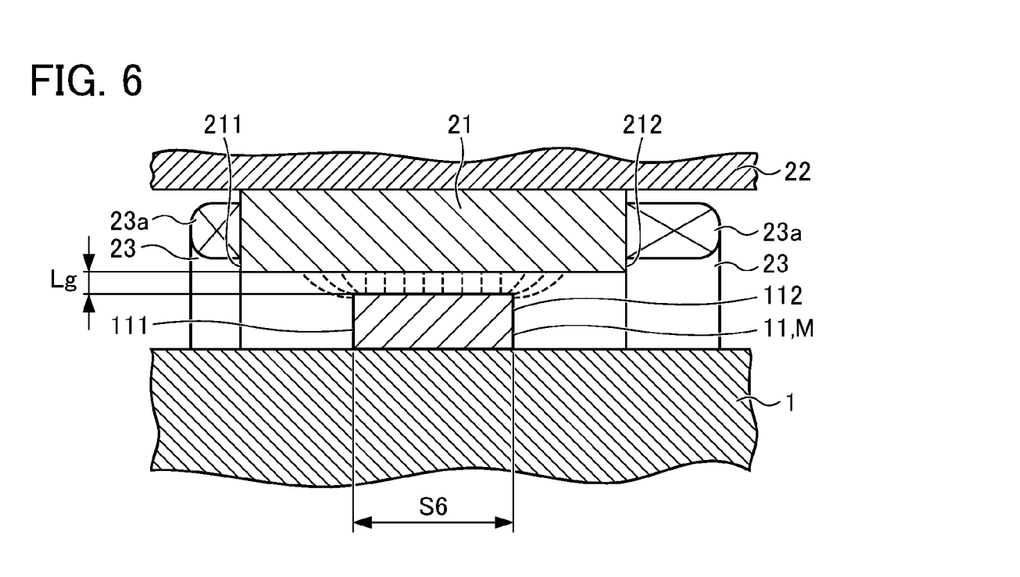
FIG. 6 is a diagram illustrating the torque generation section at the rotor side of the rotating electrical machine illustrated in FIGS. 1 and 2, and illustrates the case, in particular, in which the stator core is sufficiently long, and the intermediate position in the span of the torque generation section in the axial direction is the same as the intermediate position in the span of the stator core in the axial direction, in terms of the axial position.
Figure 7:
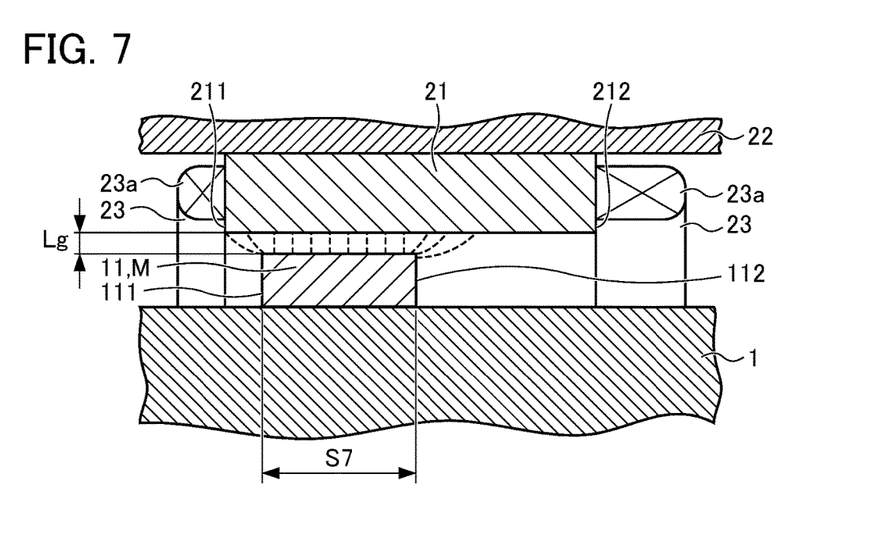
FIG. 7 is a diagram illustrating the torque generation section at the rotor side of the rotating electrical machine illustrated in FIGS. 1 and 2, and illustrates the case, in particular, in which the stator core is sufficiently long, and the intermediate position in the span of the torque generation section in the axial direction is not the same as the intermediate position in the span of the stator core in the axial direction.

Referring now to FIGS. 6 and 7, the torque generation section at the rotor side of the rotating electrical machine illustrated in FIGS. 1 and 2 is described. FIG. 6 is a diagram illustrating the torque generation section at the rotor side of the rotating electrical machine illustrated in FIGS. 1 and 2, and illustrates the case, in particular, in which the stator core is sufficiently long, and the intermediate position in the span of the torque generation section in the axial direction is the same as the intermediate position in the span of the stator core in the axial direction, in terms of the axial position. FIG. 7 is a diagram illustrating the torque generation section at the rotor side of the rotating electrical machine illustrated in FIGS. 1 and 2, and illustrates the case, in particular, in which the stator core is sufficiently long, and the intermediate position in the span of the torque generation section in the axial direction is not the same as the intermediate position in the span of the stator core in the axial direction. In FIGS. 6 and 7, members corresponding to those illustrated in FIGS. 1 and 2 are denoted by the same reference numbers. However, illustrations in FIGS. 6 and 7 are common to the interior permanent-magnet synchronous motor of FIG. 1 and the surface-mounted permanent-magnet synchronous motor of FIG. 2; therefore, the shapes, etc. are appropriately omitted or figuratively illustrated for the purpose of convenience, and most of the reference numbers are common to those in FIG. 1.

A rotating electrical machine illustrated in FIG. 6 corresponds to the interior permanent-magnet synchronous motor 100 described above with reference to FIG. 1, and the surface-mounted permanent-magnet synchronous motor 200 described above with reference to FIG. 2. A torque generation section S6 of the rotating electrical machine illustrated in FIG. 6 corresponds to the torque generation section S1 of the interior permanent-magnet synchronous motor 100 described above with reference to FIG. 1, and the torque generation section S2 of the surface-mounted permanent-magnet synchronous motor 200 described above with reference to FIG. 2. Namely, in the rotating electrical machine illustrated in FIG. 6, the intermediate position (middle position) in the span of the torque generation section S6 in the axial direction is the same as the intermediate position (middle position) in the span of the stator core 21 in the axial direction, in terms of the axial position.

Therefore, the attractive force generated by above-described lines of magnetic flux acts on both ends of the rotor 10, with the same magnitude in the opposite directions. Therefore, the force acting on the rotor 10 and the rotating shaft 1 in the axial direction, the relative position of which is fixed to the rotor 10, is balanced, cancelled by acting in opposite directions, and consequently has no action thereon. In addition, even if the ends 211, 212 of the stator core 21 or the ends 111, 112 at the rotor 10 side are tilted due to assembly errors, or the surface of the magnet M has asperities, micro-vibrations in the axial direction attributable to such factors can be suppressed. This is because, when the stator 20 (the stator core 21) is sufficiently long, the length of the lines of magnetic flux generating the above-described attractive force will be increased, and the coefficient of fluctuation of the force acting in the axial direction due to small displacement is reduced.

FIG. 7 is a diagram for illustrating the case assuming that the micro-vibration, etc. of the rotating electrical machine in the axial direction cannot be suppressed, unlike the rotating electrical machine described above with reference to FIG. 6. In the rotating electrical machine illustrated in FIG. 7, the intermediate position (middle position) in the span of the torque generation section S7 in the axial direction is not the same as the intermediate position (middle position) in the span of the stator core 21 in the axial direction, but is deviated leftwards in the aspect of FIG. 7.

Therefore, the magnitude of the attraction force generated by the above-described lines of magnetic flux acting on the left end at the rotor 10 side is smaller than the magnitude of the attraction force acting on the right end at the rotor 10 side. This is because the number and length of the lines of magnetic flux acting on the left end at the rotor 10 side is smaller than those of the lines of magnetic flux acting on the right end at the rotor 10 side. Therefore, the magnitude of the force acting on the rotor 10 and the rotating shaft 1 in the axial direction, the relative position of which is fixed to the rotor 10, is relatively larger at the right side; and therefore, the force to deviate the rotor 10 and the rotating shaft 1 to the right side constantly acts thereon. In addition, if the ends 211, 212 of the stator core 21 or the ends 111, 112 at the rotor 10 side are tilted due to assembly errors, or the surface of the magnet M has asperities, micro-vibrations will occur in the axial direction due to such factors. The amplitude of vibration depends upon the degree of deviation, in which the intermediate position (middle position) in the span of rotor (the torque generation section S7 of the rotor) in the axial direction is deviated from the intermediate position (middle position) in the span of the stator core 21 in the axial direction.

The rotating electrical machine as an embodiment of the present invention has the configuration as described above, and achieves the above-described functions and effects. Namely, the force constantly generated by the lines of magnetic flux constantly maintains the rotating shaft in the axial position. Therefore, even if a non-contact bearing is applied to these rotating electrical machines, vibration is unlikely to occur in the axial direction of the rotating shaft. Therefore, the present invention sufficiently achieves the advantages of the non-contact bearing such as minimized friction in the bearing, and high responsiveness at the starting, which is suitable for high-speed rotation, suffers from no abrasion, and is superior in durability. Note that the non-contact bearing may be a magnetic bearing, a fluid bearing, or a hybrid bearing combining the magnetic bearing and the fluid bearing, etc. Furthermore, the magnetic bearing, the fluid bearing, or the hybrid bearing combining the magnetic bearing and the fluid bearing may be a passive bearing. When the rotating electrical machine of the present invention is used to configure a machine tool, the above-described advantages of the rotating electrical machine can be sufficiently achieved, and a machine tool having high capability in processing accuracy can be embodied. In conclusion, the rotating electrical machine of the present invention can be extremely easily configured, achieves the above-described advantages, and can be easily manufactured at low cost.

Note that the present invention is not limited to the above-described embodiments, and can be implemented through alterations and changes in various ways; and alterations and improvements within the scope that can achieve the object of the invention are encompassed by the present invention.

What is claimed is:

1. A rotating electrical machine, comprising:
a stator including a stator core; and
a rotor supported on a rotating shaft supported by way of a non-contact passive bearing that does not have any positional restoration function based on feedback of displacement in the axial direction,
wherein a section, in which a torque generation member exists in an axial direction of the rotating electrical machine, is defined as a torque generation section,
wherein a first end and a second end of the stator core in the axial direction extend outwards in the axial direction from a first end and a second end of the torque generation section in the axial direction,
wherein the rotating electrical machine is configured as a synchronous motor,
wherein the torque generation member comprises an annular permanent magnet held to an outer periphery of the rotating shaft by a cylindrical rotary sleeve, and
wherein amounts of extension of the first end and the second end of the stator core in the axial direction, from the first end and the second end of the torque generation section in the axial direction at the rotor side, are such that a first attractive force which is a component force in the axial direction of an attractive force created between the first end of the stator core and the first end of the torque generation section, while the stator is exited thereby creating the lines of magnetic flux, and a second attractive force which is a component force in the axial direction of an attractive force created between the second end of the stator core and the second end of the torque generation section, while the stator is excited thereby creating the lines of magnetic flux, are the same magnitude in the opposite directions.

2. The rotating electrical machine according to claim 1, wherein a length of the first end and the second end of the stator core extending outwards in the axial direction, from the first end and the second end of the torque generation section in the axial direction, is longer than a magnetic gap length of the rotating electrical machine.

3. The rotating electrical machine according to claim 1, wherein, in the rotor, an intermediate position in a span of the torque generation section in the axial direction is the same as an intermediate position in a span of the stator core in the axial direction, in terms of an axial position.

4. The rotating electrical machine according to claim 1, wherein the non-contact bearing is any one of a magnetic bearing, a fluid bearing, or a hybrid bearing combining the magnetic bearing and the fluid bearing.

5. The rotating electrical machine according to claim 4, wherein the non-contact bearing is a passive bearing.

6. A machine tool comprising the rotating electrical machine according to claim 1.

7. A rotating electrical machine, comprising:
a stator including a stator core; and
a rotor supported on a rotating shaft supported by way of a non-contact passive bearing which does not have any positional restoration function based on feedback of displacement in the axial direction,
wherein a section, in which a torque generation member exists in an axial direction of the rotating electrical machine, is defined as a torque generation section,
wherein a first end and a second end of the stator core in the axial direction extend outwards in the axial direction from a first end and a second end of the torque generation section in the axial direction,
wherein the rotating electrical machine is configured as an induction motor,
wherein the torque generation section is a section formed by the rotor core which is provided in the axial direction, and
wherein amounts of extension of the first end and the second end of the stator core in the axial direction, from the first end and the second end of the torque generation section in the axial direction at the rotor side, are such that a first attractive force which is a component force in the axial direction of an attractive force created between the first end of the stator core and the first end of the torque generation section, while the stator is exited thereby creating the lines of magnetic flux, and a second attractive force which is a component force in the axial direction of an attractive force created between the second end of the stator core and the second end of the torque generation section, while the stator is excited thereby creating the lines of magnetic flux, are the same magnitude in the opposite directions.

* * * * *